United States Patent [19]

Effenberger et al.

[11] 4,279,515
[45] Jul. 21, 1981

[54] EXTRUDER WITH EXCHANGEABLE HOUSING INSERT

[75] Inventors: Alfred Effenberger, Leinfelden-Echterdingen; Hermann Staehle, Stuttgart, both of Fed. Rep. of Germany

[73] Assignee: Staehle Maschinenbau GmbH, Leinfelden-Echterdingen, Fed. Rep. of Germany

[21] Appl. No.: 47,777

[22] Filed: Jun. 11, 1979

[30] Foreign Application Priority Data

Jun. 13, 1978 [DE] Fed. Rep. of Germany ....... 2825825

[51] Int. Cl.³ .............................................. B29B 1/06
[52] U.S. Cl. ..................................... 366/76; 366/149; 425/208
[58] Field of Search ..................... 366/76, 79, 98, 149; 425/208

[56] References Cited

U.S. PATENT DOCUMENTS

| 2,431,274 | 11/1947 | Osborne | 425/208 X |
| 3,496,603 | 2/1970 | Listner et al. | 425/208 X |
| 3,799,510 | 3/1974 | Schott, Jr. | 366/79 X |

FOREIGN PATENT DOCUMENTS 1233133 5/1971 United Kingdom ..................... 366/76

Primary Examiner—Robert L. Bleutge
Attorney, Agent, or Firm—Karl F. Ross

[57] ABSTRACT

An extruder has a housing extending along an axis and formed with a downstream bore portion centered on the axis and upstream from this portion with a radially open recess having flat axially extending sides. An insert of generally square section is snugly receivable in this recess with its sides flatly engaging the sides of the recess. This insert is formed with a throughgoing passage forming an upstream bore portion and with a radially extending inlet open into this passage. The insert may be formed with axially extending and radially inwardly open grooves. This insert has at its ends centering formations and is releasably clamped within the housing so that a worm can extend axially through both of the bore portions which are coaxial when the insert is clamped in place. The insert is formed with a network of internal passages through which a coolant may be circulated.

10 Claims, 3 Drawing Figures

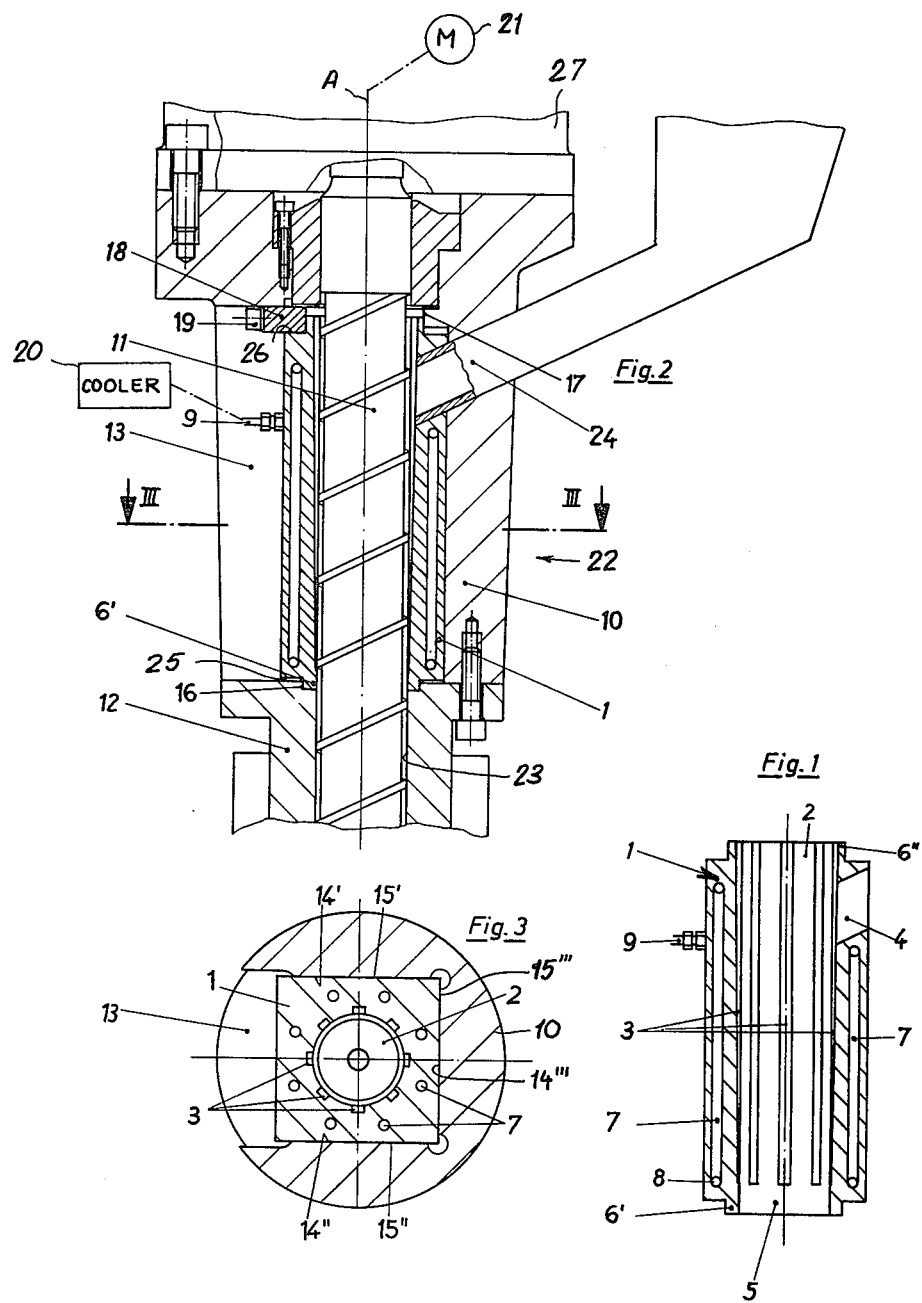

EXTRUDER WITH EXCHANGEABLE HOUSING INSERT

FIELD OF THE INVENTION

The present invention relates to an extruder for synthetic resins. More particularly this invention concerns a worm-type extruder normally used with thermoplastic synthetic resins.

BACKGROUND OF THE INVENTION

A standard worm-type extruder normally used with thermoplastic synthetic resins has a housing forming a generally cylindrical throughgoing passage which receives a worm. Granules of a synthetic resin are fed into the space between the worm and the interior wall of the passage at an upstream end thereof and the worm is rotated to displace the synthetic resin downstream while plastifying it by the combined compression and working.

In order to increase the plastification action the inner walls of the housing passage normally are formed with axially extending and inwardly opening grooves, usually of decreasing radial depth in the downstream direction. Similarly the worm is formed with one or more screwthread formations. The grooves are normally of an overall length equal to three times the diameter of the worm. Furthermore when polyolefins of medium and high molecular weight are employed the upstream portion of the housing is cooled, and a so-called thermal dam is provided part of the way along the passage so that the downstream portion of the bore or passage can remain relatively hot.

Such arrangements have proven themselves extremely efficient, in particular when used in conjunction with blow-molding apparatus. Nonetheless adaptation of these units for use with other than polyolefins of high molecular weight has not been readily possible. As the consistency of the synthetic resin being plastified changes, which consistency is normally in part a function of its molecular weight, it is necessary to change the dimensions of the screw thread formation on the worm. This can most easily be done in the normal extruder simply by axially withdrawing the worm from the housing and replacing it with another worm. Although it would be desirable normally to also change the grooves inside the passage or bore when changing resin, in practice such an alteration is almost impossibly complex, even in housings whose bores or passages are at least partially defined by inserts.

Another problem with the known extruders is that materials in the resin, such as the oxides often used to color them, are extremely hard so that the worm and housing bore are subject to considerable abrasion. Thus with time it is often necessary to replace the worm and rebuild the housing with parts constituting a new bore. Replacing the worm is an easy task, but rebuilding the housing is, as mentioned above, an extremely onerous and difficult operation, particularly in view of the fact that the parts forming the bore are normally themselves formed with internal passages that permit their cooling.

OBJECTS OF THE INVENTION

It is therefore an object of the present invention to provide an improved extruder.

Another object is the provision of such an extruder which is set up so that it is relatively easy to change not only the worm but also at least a portion of the housing to renew or change the dimension of the bore thereof.

SUMMARY OF THE INVENTION

These objects are attained according to the instant invention in an extruder wherein the housing is formed with a downstream bore portion centered on a bore axis and is formed upstream from this portion with a radially open recess. An insert is snugly receivable in this recess and is formed with a throughgoing passage itself constituting an upstream bore portion and with a radially extending inlet that opens into this passage. Means is provided for releasable and tightly securing the insert in the recess against angular and axial movement therein with the upstream and downstream bore portions of the insert and housing coaxial. A worm extends axially through both of the bore portions.

Thus with the system according to the instant invention it is a relatively easy operation to radially remove the housing insert so as to change the dimensions of the upstream bore portion, that portion normally formed with axially extending and radially inwardly open grooves. When the resins being plastified by such an extruder contain high quantities of oxide pigments it is therefore possible to change the upstream bore portion in a very short time when it does become excessively worn. Furthermore whenever the extruder is to be used with a different type of resin requiring a differently dimensioned worm and a differently dimensioned upstream bore portion, it is possible in a relatively short time to change over the extruder for such use.

According to further features of this invention the insert has at least two flat side walls that fit against corresponding and complementary planar flanks of the recess, these side walls and flanks extending parallel to the bore axis. Thus when fitted together the flat engagement of the side walls and flanks ensures completely fixed angular positioning of the insert inside the housing.

Furthermore, the ends of the insert according to this invention are formed with axially projecting centering formations centered on the axis and engageable in corresponding and complementarily shaped centering recesses or depressions formed on the ends of the recess. The downstream such pair of centering formations can be constituted by an annular ridge on a downstream end of the insert and an annular groove on the downstream end of the recess, with the groove having an axial depth somewhat smaller than the axial height of the ridge so that the insert and housing only touch at these centering formations at the downstream insert end to form a thermal dam. The centering formations at the upstream ends of the insert and groove can be arcuate and interfitting.

According to this invention the insert can have an axial length slightly shorter than the recess so that it can be fitted into the recess and then moved downstream slightly to fit the downstream centering formation together. Thereafter a holding element forming part of the securing means can be wedged tightly axially between the upstream end of the insert and the upstream end of the recess to hold the two tightly in place, with screws or the like securing this holding element in turn onto the housing.

Finally the insert according to this invention is formed with a network of internal interconnected passages, and the extruder has means for circulating a coolant through these passages. Snap connections can be provided on the insert for connecting up flexible coolant hoses to the insert so that in a very simple manner the insert according to this invention can be installed in the extruder and integrated into the cooling system therefor.

BRIEF DESCRIPTION OF THE DRAWING

FIG. 1 is an axial section through an insert according to this invention;

FIG. 2 is an axial section through an extruder provided with the insert according to this invention; and FIG. 3 is a cross section taken along line III—III of FIG. 2.

SPECIFIC DESCRIPTION

As shown in FIG. 2 an extruder according to this invention has a housing indicated generally at 22 and comprising an upstream portion 10 and a downstream portion 12, the latter being formed with a downstream bore portion 23 centered on a vertical axis A. A drive unit 27 provided with a motor 21 is bolted to the upstream portion 10 which is formed with a large radially open recess 13.

An insert 1 of square section as seen in FIGS. 1 and 3 is fittable into the recess 13. This insert 1 is formed with a generally cylindrical upstream bore portion 2 and is internally formed with rectangular-section longitudinal grooves which are radially deepest at the upper end of the insert and which taper down to nothing adjacent the lower end thereof. In addition the insert 1 is formed adjacent its upstream end with a laterally opening throughgoing inlet hole 4 adapted to receive the spout of an inlet hopper 24 which is normally filled with a granulated synthetic resin.

The insert 1 fits snugly with the housing 22 in the recess 13, with the axis of the bore 2 coaxial with the axis A. When thus installed a standard worm 11 is inserted through the aligned bores 2 and 23 and is rotated by the motor 21 in a conventional manner to plastify and downwardly displace the granulated resin fed in through the inlet 4.

The insert 1 is of square section as best seen in FIG. 3. It has a pair of parallel sides 15' and 15" which fit flatly against parallel side faces 14' and 14" of the housing portion 10. In addition it has a further side wall 15''' that fits against another side wall 14''' perpendicular to the walls 14', 14", 15' and 15". Thus when installed the insert 1 will not be able to move angularly at all.

In addition the downstream end 5 of the insert 1 is formed with a circumferential and axially projecting ridge 6' that is receivable within an annular groove 16 formed in the housing part 12. These two formations 6' and 16 are centered on the axis A to insure perfect centering of the insert 1 at this downstream end 5. In addition the groove 16 has an axial depth somewhat shorter than the axial length of the projection 6', so that a space 25 will be formed between the end 5 and the housing part 12 to act as a thermal dam to reduce heat exchange between these two parts.

The upstream end of the insert 1 is similarly formed with an annular ridge 6" that itself is received in a semicircular recess 17 of the housing part 10. The overall length of the insert 1 is shorter by a distance at least equal to the depth of the groove 16 than the recess 13, so that this insert 1 can be set into the recess 13, then displaced axially downstream to fit the formations 6' and 16 together. Thereafter a holding block 18 securable by screws 19 is fitted into a groove 26 at the upstream end of the insert 1 to bear axially against the housing part 10 and lock the insert 1 at the upstream end against radial displacement. In this manner the insert 1 can be locked extremely securely in place against any axial, radial or angular movement relative to the axis A.

The insert 1 is formed with longitudinally extending passages 7 interconnected via circumferential passages 8 to form a network of coolant passages which may be supplied with a coolant via a snap connection 9 from the cooler 20. This connection 9 can be readily disconnected for exchanging the insert 1.

Thus the system according to the instant invention allows the insert forming the upstream bore portion to be changed extremely easily. A single extruding machine can therefore be used to handle many different kinds of resins, making it possible for a small-scale operation to perform various types of blow molding with a single machine. Moreover if the insert 1 wears excessively due to the use of a synthetic resin having a pigment formed of highly abrasive oxide particles it is possible to exchange this insert 1 relatively easily.

We claim:

1. An extruder comprising:

a housing extending along an axis and having integral upstream and downstream housing portions, said housing formed at said downstream housing portion with a radially closed downstream bore portion centered on said axis and at said upstream housing portion upstream from said downstream portions with a recess opening only in one radial direction from said axis and communicating with said downstream bore portion;

an insert snugly receivable in said recess, said insert being formed with a throughgoing passage forming an upstream bore portion and with a radially extending inlet opening into said passage;

means for releasably and tightly securing said insert in said upstream housing portion in said recess against angular and axial movement therein with said bore portions coaxial; and a worm extending axially through both of said bore portions.

2. The extruder defined in claim 1 wherein said recess has a pair of side walls lying substantially in planes parallel to said axis, said insert having a pair of substantially planar flanks snugly fittable against said side walls with said portions coaxial.

3. The extruder defined in claim 2 wherein said insert is substantially rectangular in section, said recess being radially closed on three sides and radially open on one side.

4. The extruder defined in claim 3 wherein said insert is substantially square in section.

5. An extruder comprising:

a housing extending along an axis and formed with a downstream bore portion centered on said axis and upstream from said portion with a radially open recess;

an insert snugly receivable in said recess, said insert being formed with a throughgoing passage forming an upstream bore portion and with a radially extending inlet opening into said passage, said insert having a pair of axial ends at least one of which is formed with an annular centering formation centered on said axis, said recess having a pair of axial ends one of which is formed with a complementary centering formation centered on said axis and capable of snugly interfitting with said formation of said insert;

means for releasably and tightly securing said insert in said recess against angular and axial movement therein with said portions coaxial; and a worm extending axially through both of said bore portions.

6. The extruder defined in claim 5 wherein said centering formation of said insert is an axially projecting annular ridge on the end closer to said downstream bore portion, said centering formation of said housing being an annular axially open groove.

7. The extruder defined in claim 6 wherein said insert and housing engage substantially only at said formations at said one ends.

8. The extruder defined in claim 7 wherein said formations of said other ends include an arcuate cutout in said recess and an arcuate projection on said insert, said insert having an axial length between its said ends slightly shorter than the axial length of said recess between its said ends.

9. The extruder defined in claim 5 wherein the other ends of said insert and recess are similarly formed with such complementary centering formations.

10. The extruder defined in claim 1 wherein said insert is formed with throughgoing cooling passages, said extruder further comprising means for circulating a coolant through said cooling passages.

* * * * *